United States Patent
Ichinose et al.

(10) Patent No.: US 8,848,050 B2
(45) Date of Patent: Sep. 30, 2014

(54) DRIVE ASSIST DISPLAY APPARATUS

(75) Inventors: Tadao Ichinose, Kanagawa (JP); Koji Takahashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/611,750

(22) Filed: Sep. 12, 2012

(65) Prior Publication Data

US 2013/0038714 A1 Feb. 14, 2013

Related U.S. Application Data

(63) Continuation of application No. PCT/JP2011/001845, filed on Mar. 29, 2011.

(30) Foreign Application Priority Data

Nov. 29, 2010 (JP) .................. 2010-265153

(51) Int. Cl.
- *H04N 7/18* (2006.01)
- *G06K 9/00* (2006.01)
- *B60Q 1/48* (2006.01)
- *B60R 1/00* (2006.01)
- *B62D 15/02* (2006.01)

(52) U.S. Cl.
CPC ............ *B60R 1/00* (2013.01); *B60R 2300/607* (2013.01); *B60R 2300/305* (2013.01); *B60R 2300/302* (2013.01); *B60R 2300/303* (2013.01); *B60R 2300/806* (2013.01); *B62D 15/029* (2013.01); *B60R 2300/105* (2013.01)
USPC ........................ 348/118; 382/104; 340/932.2

(58) Field of Classification Search
CPC ............... B60R 1/00; B60R 2300/105; B60R 2300/302; B60R 2300/305; G06K 9/00791; G06K 9/00798; G06T 2207/10016; G08G 1/16; G08G 1/14; G07B 15/02
USPC ........................ 348/118; 340/932.2; 382/104
See application file for complete search history.

(56) References Cited

U.S. PATENT DOCUMENTS

| 7,256,688 B2 | 8/2007 | Mizusawa |
| 2004/0150589 A1* | 8/2004 | Mizusawa ...................... 345/70 |
| 2007/0057816 A1* | 3/2007 | Sakakibara et al. ....... 340/932.2 |
| 2011/0095910 A1 | 4/2011 | Takano |

FOREIGN PATENT DOCUMENTS

| JP | 2003-104145 A | 4/2003 |
| JP | 2003-149711 A | 5/2003 |
| JP | 2005-167638 A | 6/2005 |
| JP | 2005-341153 A | 12/2005 |

(Continued)

OTHER PUBLICATIONS

International Search Report for PCT/JP2011/001845 dated Jun. 7, 2011.

*Primary Examiner* — Dave Czekaj
*Assistant Examiner* — Tsion B Owens
(74) *Attorney, Agent, or Firm* — Pearne & Gordon LLP

(57) ABSTRACT

Provided is a drive assist display apparatus which displays a main view 20 showing an image of a wide backward area of the vehicle, and a sub view 21-4 showing a view point conversion image as if looked down from a virtual viewpoint to a vicinity of the vehicle 1, the sub view 21-4 having a down side region showing a moderate part of the bumper 13 and an up side region showing a subject in a distance area from the vehicle 1, and spread in form with increasing distance from a corresponding position of the vehicle 1.

1 Claim, 20 Drawing Sheets

(56) References Cited

FOREIGN PATENT DOCUMENTS

| JP | 2006-339960 A | 12/2006 |
| JP | 2007-168560 A | 7/2007 |
| JP | 2007-295043 A | 11/2007 |
| JP | 2009-173122 A | 8/2009 |
| JP | 2009-298178 A | 12/2009 |
| JP | 2010-128939 A | 6/2010 |

* cited by examiner

DRIVE ASSIST DISPLAY APPARATUS

TECHNICAL FIELD

The present invention relates to a drive assist display apparatus for performing image processing to provide a driver with an image taken backwardly or forwardly from a vehicle by a vehicle-mounted camera.

BACKGROUND ART

There have so far been proposed a wide variety of drive assist display apparatuses for providing a driver with an image taken by a vehicle-mounted camera mounted on such as a rear trunk or a front grille of a vehicle to make the driver sense a backward or a forward of the vehicle.

The conventional drive assist display apparatus is designed to operate a variety of image display methods of, for example, correcting the image for the influence of the deformation of a lens, and converting the image as if taken from any virtual viewpoint.

The conventional drive assist display apparatus of this type is disclosed in a Patent Literature 1.

The Patent Literature 1 discloses a sub view having a display form of a simple rectangle. FIGS. 10 and 12 exemplify two processed images each relating to a display range of a view point conversion image shown in the sub view.

In each of FIGS. 10 and 12, the reference sign 20 indicates a main view showing an image of a wide backward area of the vehicle, the image assumed to be clipped from the taken image.

In FIG. 10, the reference sign 21-1 indicates the sub view showing an image of an area having a width about twice the width of the vehicle, the image obtained by a view point conversion at a vicinity area of the vehicle from the taken image.

In FIG. 12, the reference sign 21-2 indicates the sub view showing an image of an area having a width that at most allows white side lines of a parking space to be displayed, the image obtained by the view point conversion at the vicinity area of the vehicle from the taken image.

in each of FIGS. 10 and 12, the reference signs 22-1 and 22-2 indicate mask picture views filling spaces between the main and sub views without showing any taken image.

In regard to these examples of the processed images, it will be hereinafter explained how the taken image is displayed under a detailed imaging condition.

Firstly described will be a positional relationship between the vehicle-mounted camera constituting a imaging section and the vehicle having the vehicle-mounted camera mounted therein.

The positional relationship is exemplified in each of FIGS. 4 and 5. FIG. 4 shows an overhead view of the backward of the vehicle 1. FIG. 5 shows a side view of the backward of the vehicle 1.

It is assumed that an image of a vicinity of a parking lot is taken.

FIG. 6 shows an example of the parking lot with white lines forming three isometric parking spaces, and isometric vehicles respectively parked in the left and right parking spaces. The reference signs 17-1 and 17-2 indicate the respective parked vehicles each having a height of 1.5 m and assumed to have a shape of a cuboid for better understanding of the present invention.

FIG. 7 shows a positional relationship between the parking lot shown in FIG. 6 and the vehicle 1 trying to park backwardly into the center parking space 16-3.

FIG. 9 shows the taken image before performing an image processing under the state shown in FIG. 7. In this example, the vehicle-mounted camera has a wide-angle lens to take the image of the wide area. Accordingly, the taken image has an image circle 19 appear therein.

In regard to the taken image shown in FIG. 9, the display image is shown as FIG. 11 in accordance with the example shown in FIG. 10, and the display image is shown as FIG. 13 in accordance with the example shown in FIG. 12.

In FIGS. 11 and 13, the main views 20 show the respective images obtained by the same processing as cutting away left, right, top and bottom parts from the taken image shown in FIG. 9. In detail, the main view 20 shows an image of an imaging range that moderately covers a part of a bumper 13 of the vehicle 1 in a down side region and parts of the vehicles respectively parked in the left and right parking spaces in an up side region, and has an angle of view about 160 degrees between left and right sides.

In FIG. 11, the sub view 21-1 shows the view point conversion image of the vicinity of the vehicle 1 as if looked down from the virtual viewpoint, and the view point conversion image includes images about half of the vehicles 17-1 and 17-2 in respective left and right side regions.

In FIG. 13, the sub view 21-2 shows the view point conversion image of the vicinity of the vehicle 1 as if looked down from the virtual view point as same as the sub view 21-1, but the view point conversion image shown in sub view 21-2 is narrower in the imaging range from a left side to a right side than the view point conversion image shown in the sub view 21-1 as including the white side lines of the center of the parking space 16-3.

The sub views 21-1 and 21-2 show images of the same imaging range shown in a region near side of the bumper 13 and the same imaging range shown in a distant region from the vehicle 1.

In general, the whole image of the backward of the vehicle is horizontally flipped before displaying. However, in the description, the whole image of the backward of the vehicle is not horizontally flipped before displaying for better understanding of a left-to-right relationship in the taken image and the display image. Accordingly, the left-to-right relationship regarding the vehicle-mounted camera 2 is same as that of the displayed image.

Regarding FIG. 12, the taken image of the vicinity of the parking lot from the vehicle 1 traveling with turning will be hereinafter exemplified.

FIG. 8 shows an example of a case that the vehicle 1 travels from a point A to a point D in the parking lot shown in FIG. 6, in this example, the vehicle 1 travels from the point A to a point B on a straight line having a gap of 0.35 m with respect to a center line of the center parking space 16-3, travels from the point B to a point C with turning in a radius of 10 m toward the center line of the center parking space 16-3, and travels from the point C to a point D with reversely turning in a radius of 10 m to be in a direction parallel to the parking space 16-3.

in this example, the display image exemplified in FIG. 12 is shown as FIG. 18. As a matter of course, a positional relationship between the bumper 13 of the vehicle 1 and the vehicle-mounted camera 2 is fixed, thereby leading to the fact that the bumper 13 is constantly displayed on the same place.

CITATION LIST

Patent Literature

[PLT 1]
Patent Literature 1: Japanese Patent Laid-Open Publication 2003-104145

SUMMARY OF INVENTION

Technical Problem

However, the display form of the sub view disclosed in the Patent Literature 1 encounters four problems as follows.

The first problem occurs in case that the display range of the sub view 21-1 is wide relative to the width of the vehicle 1 as exemplified in FIG. 11. The bumper 13 of the vehicle 1 has a height from a horizontal ground surface 14, thereby resulting in the fact that the bumper 13 having a real vehicle width of 1.8 m is displayed wider than the center parking space 16-3 having a width of 2.5 m in the view point conversion image. Accordingly, the conventional display form of the sub view has a problem to make an impression on a driver that the vehicle 1 collides with the vehicles 17-1 and 17-2 parked in the respective left and right parking spaces if the vehicle 1 travels backward with the current posture.

The second problem occurs in case that the width of the display range of the sub view is shorten to resolve the first problem as previously mentioned. If the width of the display range of the sub view is shorten in conformity to the width of the vehicle 1 as the sub view 21-2 shown in FIG. 13, the impression of the colliding can be avoided. However, the conventional display form of the sub view has a problem to increase an occurrence of a case that the white lines of the parking lot available for a parking point adjustment are not displayed because of the fact that the width of the display range of the sub view is shorten.

In detail, the second problem raises two specific problems as shown in FIG. 18.

One specific problem occurs in case that the center of the vehicle 1 is out of alignment with the center of the center parking space 16-3 as being from the point A to the point B. At this time, the fact that the center of the vehicle 1 is out of alignment with the center of the center parking space 16-3 is recognized by a position of a subject displayed on the sub view 21-2, but one of the white side lines is not displayed. As a result, it is difficult to be recognized how far the center of the vehicle 1 is out of alignment with the center of the center parking space 16-3.

Other specific problem occurs in case that the vehicle 1 is inclined with respect to the center parking space 16-3 as being at the point C. At this time, the white right side line is displayed with interruption. As a result, a degree of inclination is needed to be determined on the basis of the white side line displayed without interruption.

The third problem occurs in case that the vehicle is turned in response to a turned steering wheel. The third problem is difficulty of pre-recognizing an inclined direction of the vehicle on the image currently displayed. The conventional display form of the sub view has a problem that the pre-recognizing can not be achieved with directly predicted from the display form by the reason that each of the sub views 21-1 and 21-2 has a form of a simple rectangle.

The fourth problem is difficulty of recognizing a direction with respect to the vehicle of each part of a distant side from the vehicle. The distant side from the vehicle is displayed as a straight line, thereby leading to the fact that the direction of each part of the distant side with respect to the vehicle can not be recognized with directly predicted from its form even if seen any region such as left, right or center region within the display image. Therefore, the conventional display form of the sub view has a problem to force to predict the direction of each part with respect to the vehicle after recognition of each part on the left, right, or center region within the displayed image.

it is, therefore, a subject of the present invention to provide a drive assist display apparatus which can display the sub view showing an image of the imaging range needed for the parking point adjustment, and make an easy recognition of the accurate width of the vehicle, pre-recognition of the inclined direction of the turned vehicle, and recognition of the direction of the subject with respect to the vehicle.

Solution to Problem

According to one aspect of the present invention to resolve the conventional problems above mentioned, there is provided a drive assist display apparatus comprises: one or more imaging sections operable to take an image of a wide area of one of rear and front of a vehicle; an image processing section operable to create a main view showing an image of a wide area around the vehicle by clipping or correcting from the image taken by the imaging sections, create a sub view showing a view point conversion image of a vicinity of the vehicle from the image taken by the imaging sections as if looked down from a virtual viewpoint, combine the main view with the sub view, and fill a space with a mask picture; and an image displaying section operable to display the image processed by the image processing section, wherein the drive assist display apparatus is designed to display the sub view formed by two sides each corresponding to a backward or forward direction of the vehicle with spreading the two sides widely in response to an increasing distance from a corresponding position of the vehicle.

in accordance with the above construction, the display region corresponding to the area distant from the vehicle can be displayed wider than the display region corresponding to the vicinity area of the vehicle. Additionally, the left and right sides can be displayed in forms respectively inclined to the left and right.

The drive assist display apparatus may be designed to bend a form of a distant side of the sub view from a corresponding position of a center of the vehicle without creasing with closing to a line corresponding to a line of an imaging range at a constant distance from the center of the vehicle.

In accordance with the above construction, left and right hands of the center of the vehicle can be displayed in forms bent as respectively inclined diagonally left and right down.

Advantageous Effects of Invention

As mentioned above, the drive assist display apparatus of the present invention can make the display region of the sub view corresponding to the vicinity area of the vehicle keep in width nearly equal to the width of the vehicle, and make the display region of the sub view corresponding to the area distant from the vehicle increase in width. This leads to the fact that the size of the vehicle can be correctly recognized, and the white side line away rightward or leftward from the vehicle by the vehicle out of alignment can be easily displayed.

Additionally, it can be directly predicted which direction the side of the vehicle will be inclined with respect to the currently displayed image in case that the vehicle is turned in response to a turned steering wheel from this time, by the reason that the inclinations of the left and right sides on the sub view respectively close to the inclinations of the sides of the vehicle under the case.

in accordance with the drive assist display apparatus of the present invention, it can be directly predicted which direction a rear portion of the vehicle will be inclined with respect to the currently displayed image in case that the vehicle is turned in response to a turned steering wheel from this time, by the reason that the inclination of a bent portion of the sub view closes to that of the rear portion of the vehicle under the case.

Additionally, in case that a vicinity of right, left or center of the bent portion is notably watched, the image is recognized to be displayed the direction such as, for example, a right, left or center direction with respect to the vehicle on the basis of a degree of inclination of the bent portion.

DESCRIPTION OF EMBODIMENTS

The embodiments of the present invention will be described hereinafter with reference to the drawings.

(First Embodiment)

Figure 1:
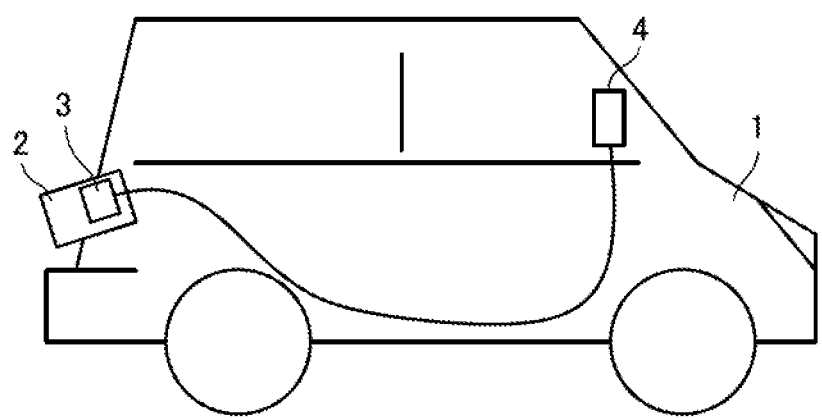
FIG. 1 is a configuration diagram showing a construction of the drive assist display apparatus according to first and second embodiments of the present invention.

FIG. 1 is a configuration diagram of the first embodiment of the present invention.

As shown in FIG. 1, the reference sign 1 indicates a vehicle mounting a drive assist display apparatus therein, the reference sign 2 indicates a vehicle-mounted camera having a wide-angle lens for taking an image of a wide area, and the reference sign 3 indicates an image processing section accommodated in the vehicle-mounted camera 2. The image processing section 3 is operable to create a main view showing an image of a wide area around the vehicle by clipping or correcting from the image taken by the vehicle-mounted camera 2, create a sub view showing a view point conversion image of a vicinity of the vehicle from the image taken by the vehicle-mounted camera 2 as if looked down from a virtual viewpoint, combine the main view with the sub view, and fill a space with a mask picture. The reference sign 4 indicates a monitor for displaying the image processed by the image processing section 3.

Figure 2:
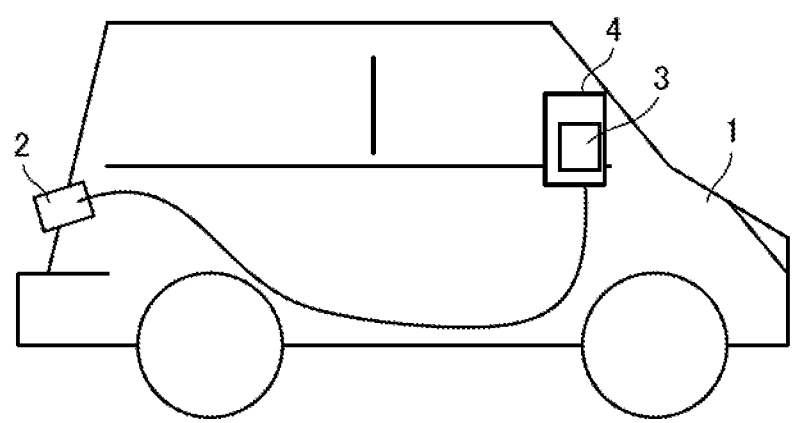
FIG. 2 is a configuration diagram showing a construction of the drive assist display apparatus according to first and second embodiments of the present invention.
Figure 3:
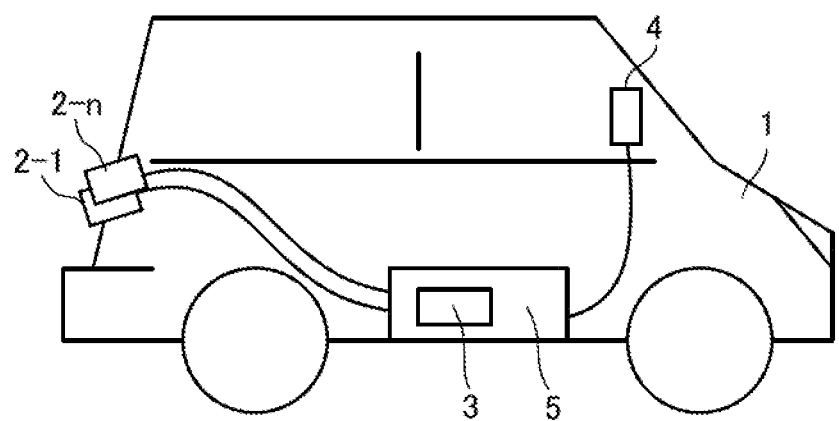
FIG. 3 is a configuration diagram showing a construction of the drive assist display apparatus according to first and second embodiments of the present invention.

While there has been described in the forgoing description about the fact that the image processing section 3 is accommodated in the vehicle-mounted camera 2, the image processing section 3 may be accommodated in the monitor 4 as shown in FIG. 2. The image processing section 3 may also be accommodated in an image processing apparatus 5 as shown in FIG. 3. As shown in FIG. 3, the vehicle-mounted camera 2 may be replaced by a plurality of vehicle-mounted cameras 2-1 to 2-n each having a non wide-angle lens.

While there have been shown in FIGS. 1 to 3 about the fact that the vehicle-mounted camera 2 is mounted on the rear side of the vehicle, the vehicle-mounted camera 2 may be mounted on the front side of the vehicle. In the first and second embodiments of the present invention, the vehicle-mounted camera 2 is described as mounted on the rear side of the vehicle.

Hereinafter, an example of an imaging condition will be described with reference to FIGS. 4 to 9.

Figure 4:
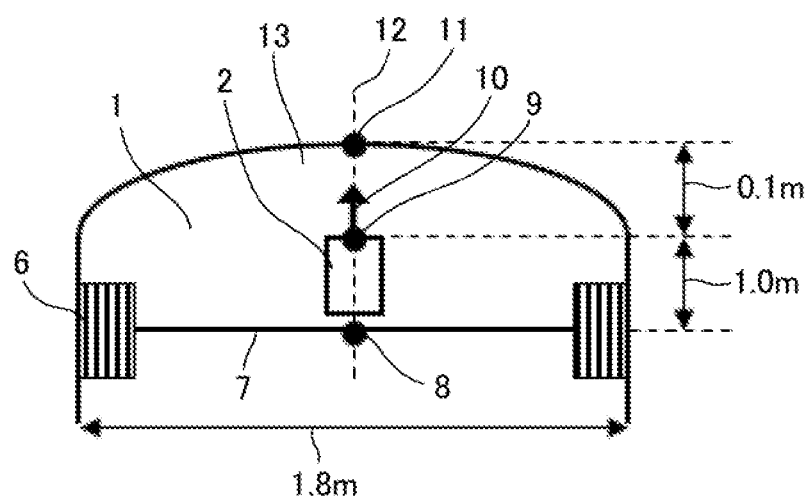
FIG. 4 is a conceptual diagram showing a detailed mounted state of a vehicle-mounted camera with respect to a vehicle.
Figure 5:
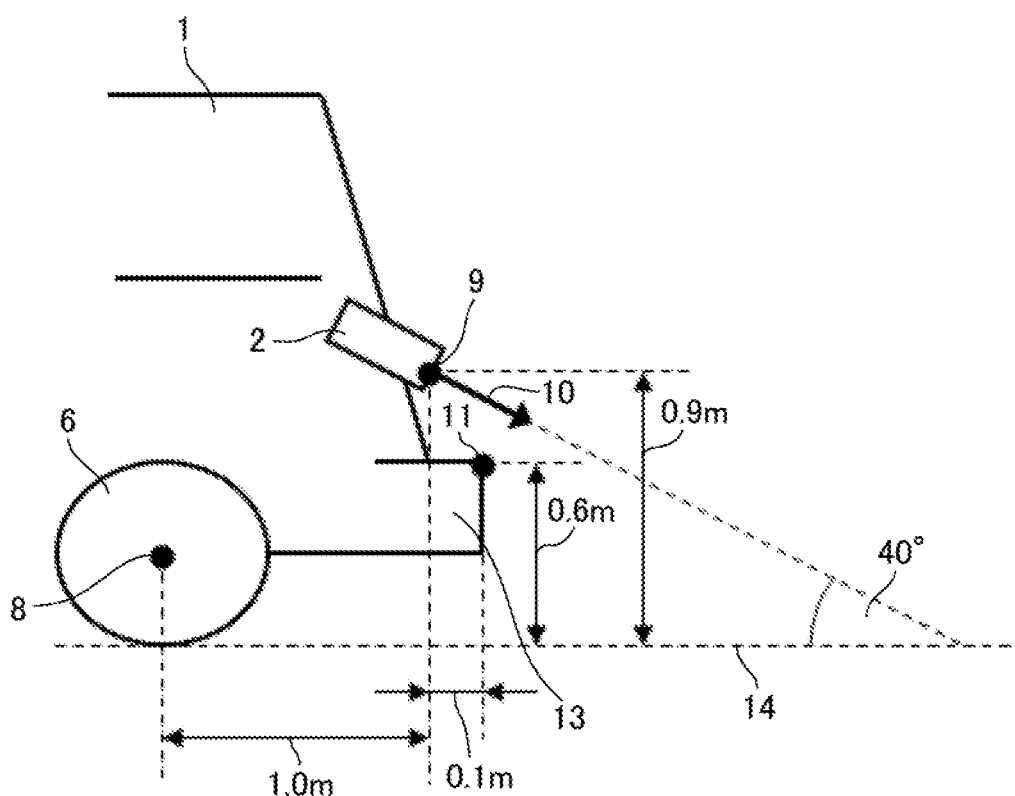
FIG. 5 is a conceptual diagram showing a detailed mounted state of the vehicle-mounted camera with respect to the vehicle.

FIGS. 4 and 5 each shows a detailed mounted state of the vehicle-mounted camera 2 with respect to the vehicle 1.

FIG. 4 shows an overhead view of the backward of the vehicle 1. The reference sign 12 indicates a vehicle left-right center line passing through a center of left and right sides of the vehicle 1. The reference sign 6 indicates a rear wheel of the vehicle 1. The reference sign 7 indicates a rear axle of the vehicle 1. The reference sign 8 indicates a center point of left and right edges of the rear axle 7 on the vehicle left-right center line 12. The reference sign 9 indicates a position of the lens of the vehicle-mounted camera 2 on the vehicle left-right center line 12. The reference sign 10 indicates an optical axis of the lens of the vehicle-mounted camera 2. The optical axis 10 is in parallel relationship with the vehicle left-right center line 12. The reference sign 13 indicates a rear bumper of the vehicle 1. The reference sign 11 indicates a rear edge portion of the vehicle on the vehicle left-right center line 12 and the bumper 13. The vehicle 1 has a width of 1.8 m. The position 9 of the lens has a distance of 1.0 m to the rear axle 7 and a distance of 0.1 m to the rear edge portion 11 of the vehicle 1.

FIG. 5 shows a side view of the backward of the vehicle 1. The reference sign 14 indicates the horizontal ground surface. The position 9 of the lens is at 0.9 m in height from the horizontal ground surface 14. The optical axis 10 has an angle of 40 degrees with respect to the horizontal ground surface 14. The rear edge portion 11 of the vehicle is at 0.6 m in height from the horizontal ground surface 14.

Figure 6:
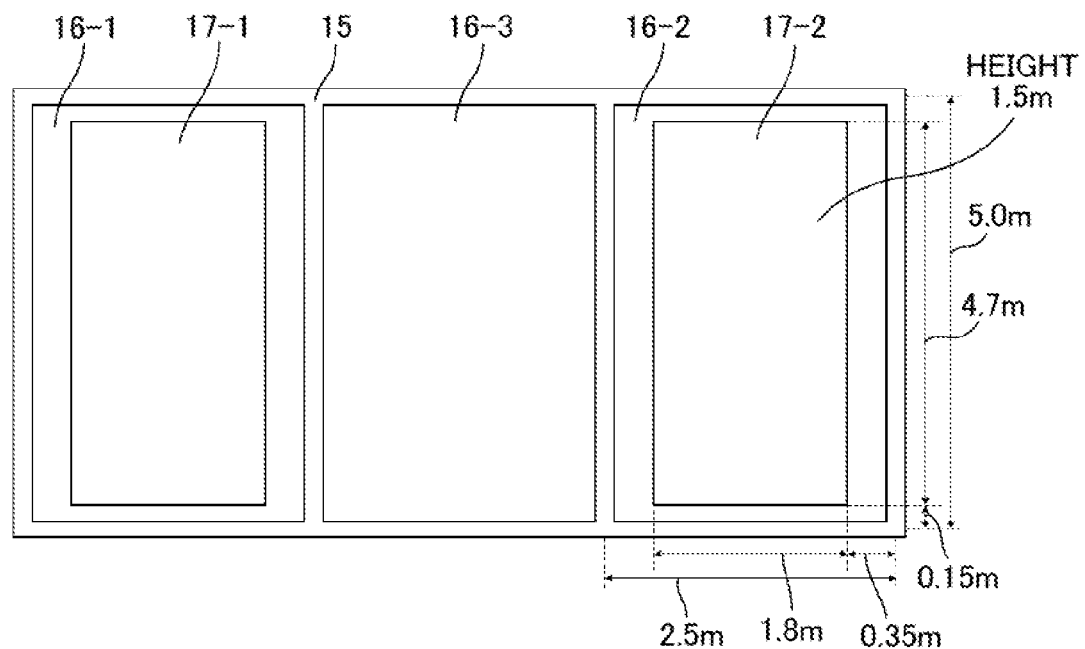
FIG. 6 is a conceptual diagram showing size of a parking lot and peripheral vehicles as an example of a subject.

FIG. 6 shows sizes of parking spaces and sizes of parked vehicles as examples of subjects. The reference signs 16-1, 16-2 and 16-3 respectively indicate left, right and center parking spaces. The reference sign 15 indicates white lines drawn on the horizontal ground surface 14 to form the left, right and center parking spaces 16-1, 16-2 and 16-3.

The left, right and center parking spaces 16-1, 16-2 and 16-3 have the same size with one another. Each parking space 16-1, 16-2 and 16-3 has a length of 5.0 m and a width of 2.5 m on the center of thickness of the white line 15 basis. The reference sign 17-1 indicates the vehicle parked in the left parking space 16-1 and assumed to have a shape of a cuboid. The reference sign 17-2 indicates the vehicle parked in the right parking space 16-2 and assumed to have a shape of a cuboid.

The vehicles 17-1 and 17-2 have the same size, each having 1.8 m in width, 4.7 m in length and 1.5 m in height, and parked at a center of the respective left and right parking spaces.

Figure 7:
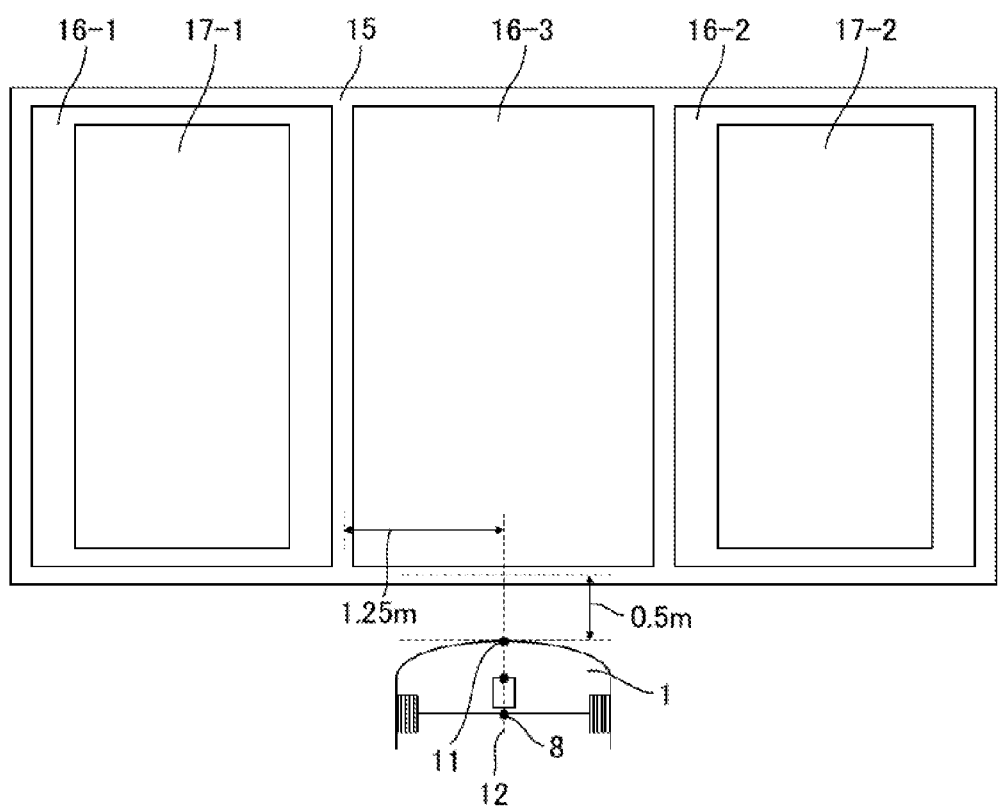
FIG. 7 is a conceptual diagram showing an example of a positional relationship between the parking lot and the vehicle.

FIG. 7 shows an example of a positional relationship between the parking lot shown in FIG. 6 and the vehicle 1. In this example, the vehicle left-right center line 12 passes thorough a center of width of the center parking space 16-3. The rear edge portion 11 of the vehicle is at 0.5 m away from the near side white line forming the center parking space 16-3

Figure 9:
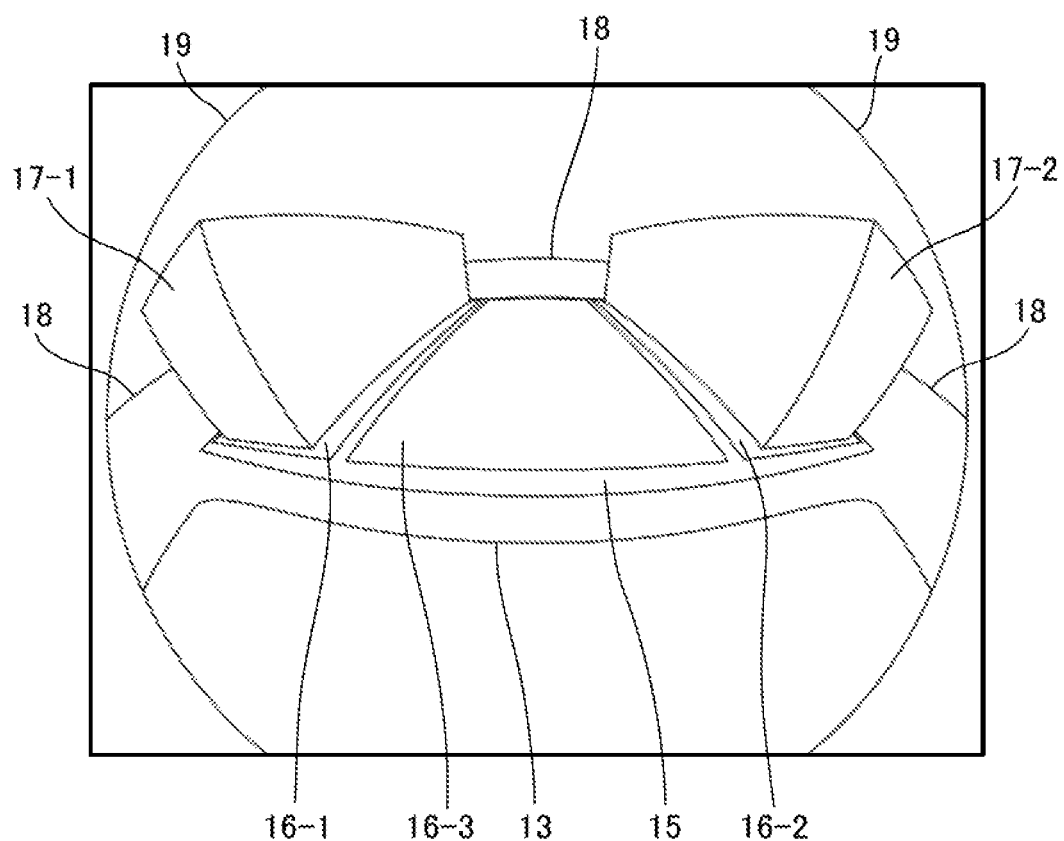
FIG. 9 is a conceptual diagram showing a taken image.
Figure 10:
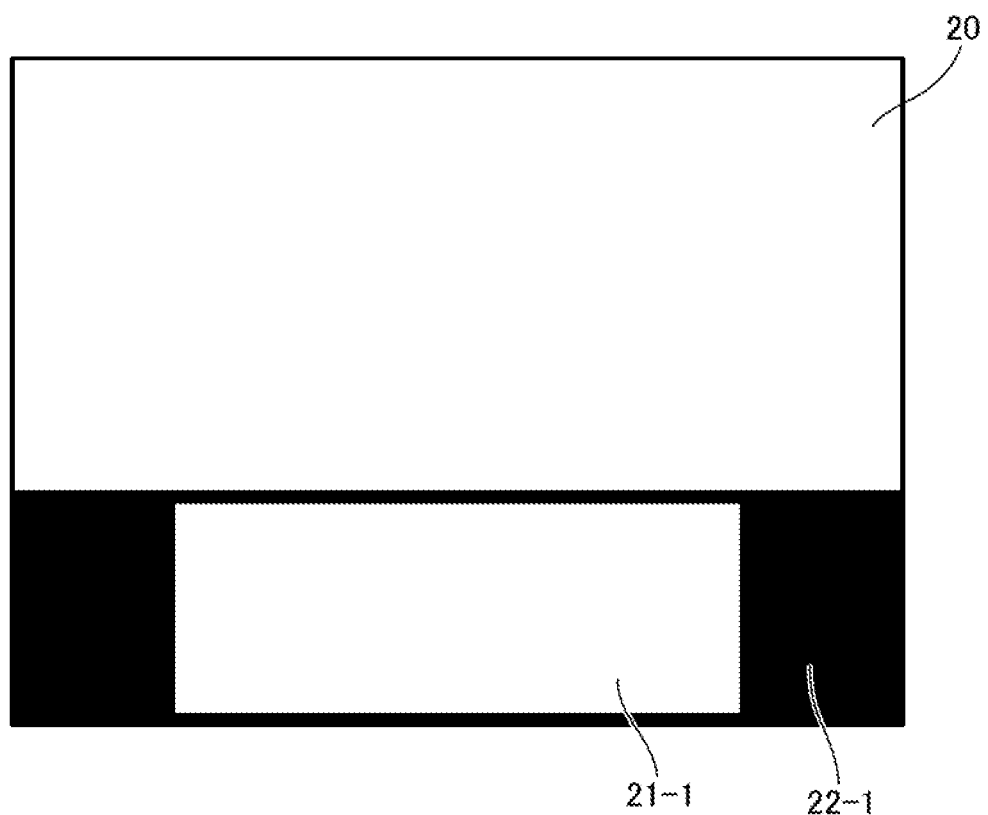
FIG. 10 is a conceptual diagram showing a displayed image processed by a conventional image processing.

FIG. 9 shows an image taken by the vehicle-mounted camera 2 under the state shown in FIG. 7. The reference sign 18 indicates an image of the horizon taken under the state that no solid object exists in front of the vehicle-mounted camera 2 The reference sign 19 indicates an image circle assumed to be taken with an angle at 90 degrees around the optical axis of the lens.

Figure 8:
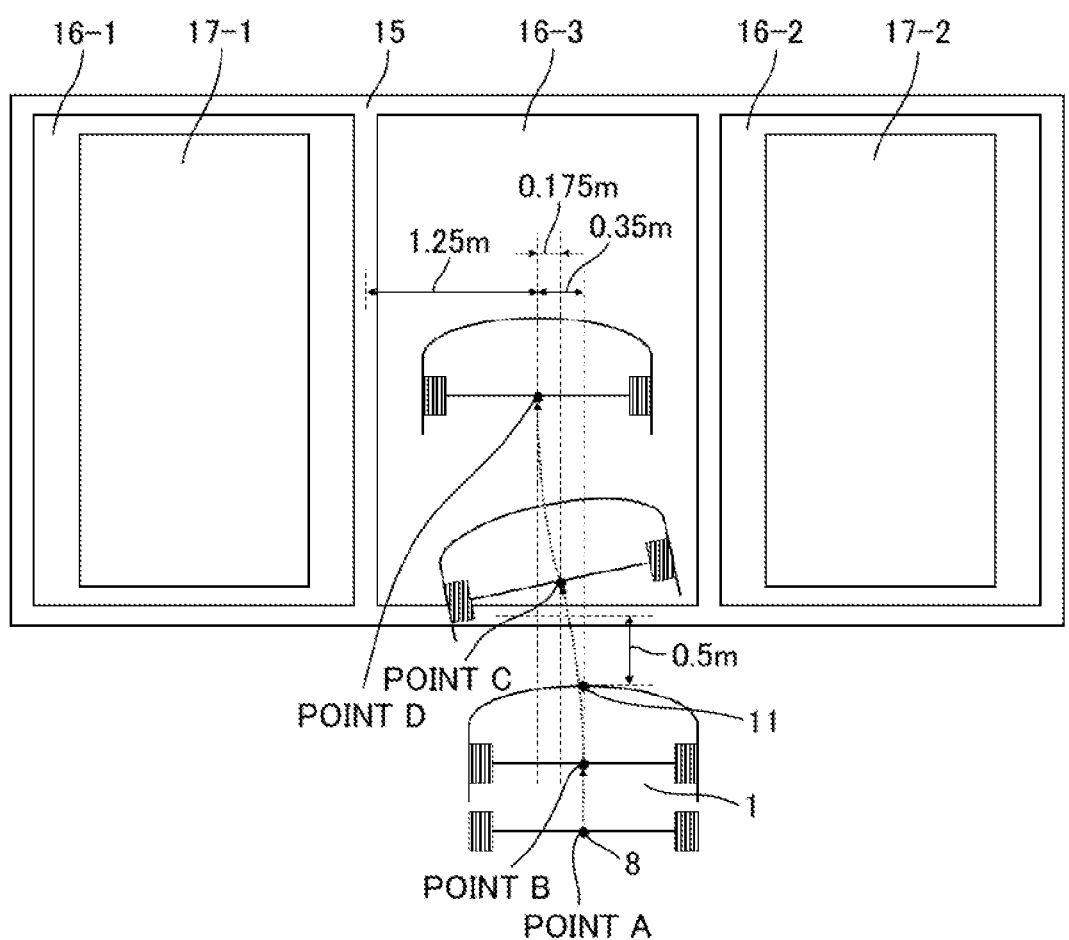
FIG. 8 is a conceptual diagram showing an example of a positional relationship between the parking lot and the traveling vehicle.

FIG. 8 shows an example of a positional relationship between the parking lot and the traveling vehicle 1. In this example, the vehicle 1 travels to park at the center of the center parking space 16-3 with adjustment its position from the point A.

The point A is at 2.1 m from the near side white line 15 forming the center parking space 16-3 and has a gap of 0.35 m rightward away from the center of width of the center parking space 16-3. The point B is at 1.6 m from the near side white line 15 forming the center parking space 16-3. The point C is on a curved line having a radius of 10 m from the point B and has a gap of 0.175 m, i.e., half of the gap of the point A away from the center of width of the center parking space 16-3. The point D is on a curved line reversely curved with respect to the curved line from the point B to the point C and having a radius of 1.0 m from the point C, and has no gap from the center of width of the center parking space 16-3.

Hereinafter, an operation of the image processing section 3 will be explained.

FIGS. 14, 15, 19 and 21 show the displayed images displayed on the monitor 4 which are respectively obtained by the same processing of the image processing section 3 from the taken images. In general, the whole image of the backward of the vehicle is horizontally flipped before displaying. However, in the first and second embodiments of the present invention, the whole image of the backward of the vehicle is not horizontally flipped before displaying for better understanding of a left-to-right relationship between the taken image and the display image.

Figure 14:
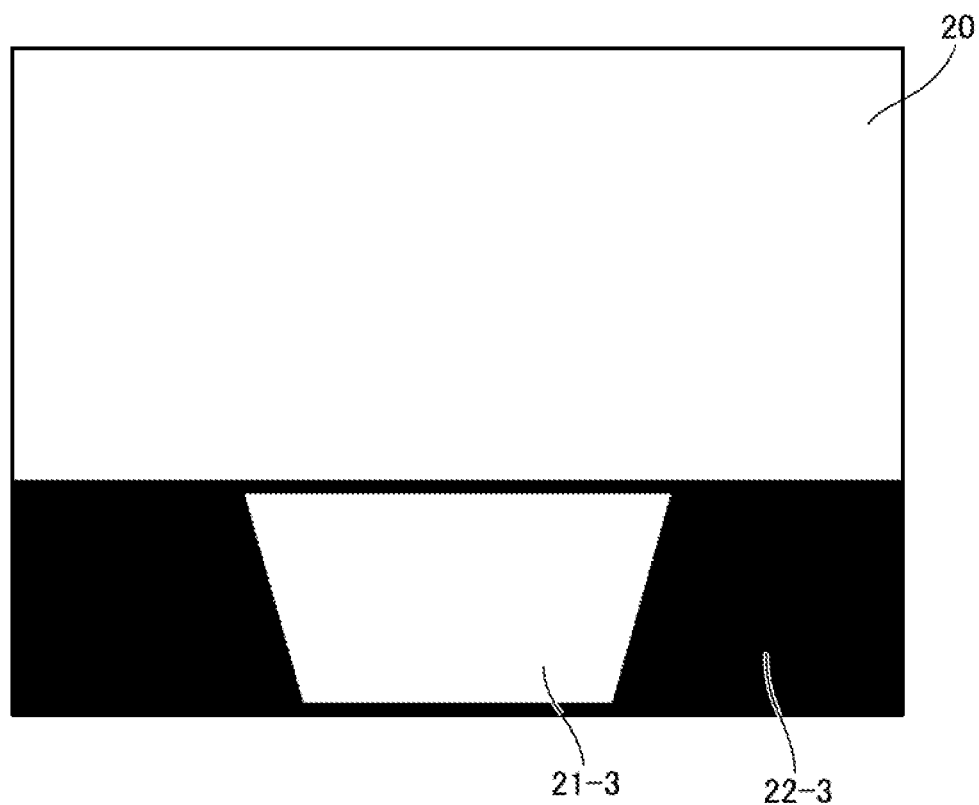
FIG. 14 is a conceptual diagram showing a displayed image processed by an image processing according to the first embodiment of the present invention.
Figure 15:
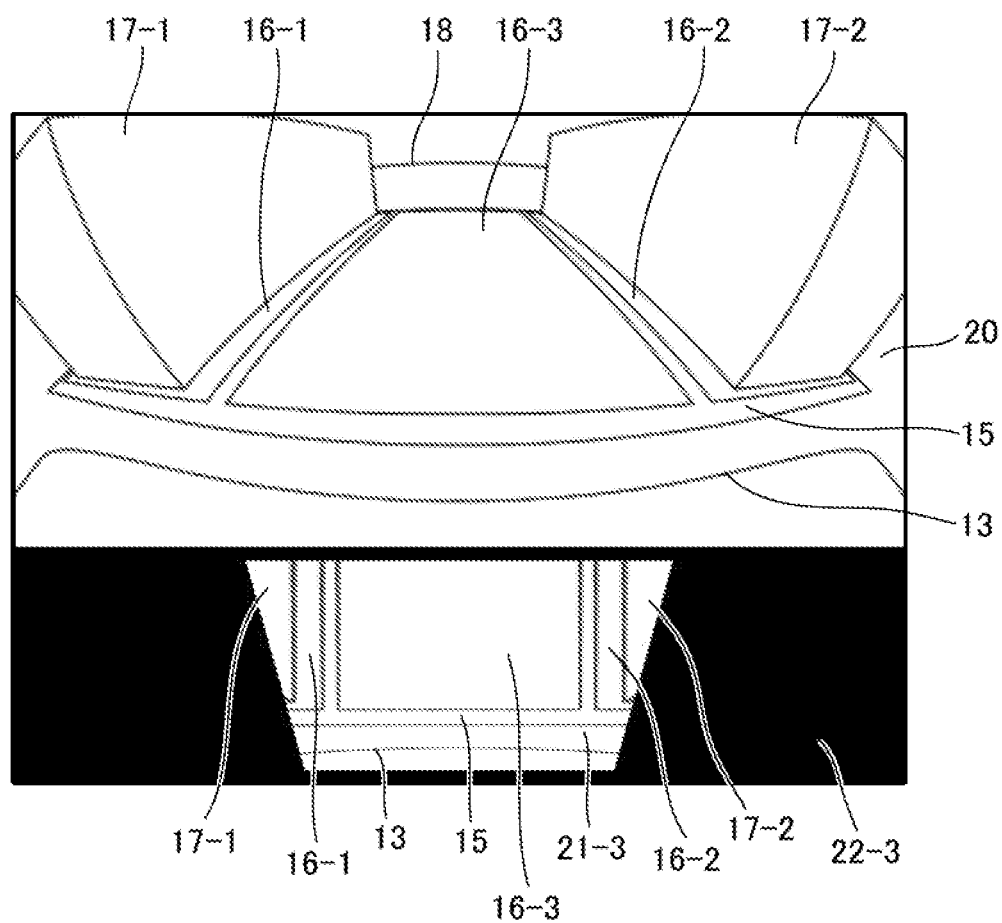
FIG. 15 is a conceptual diagram showing a displayed image processed by an image processing according to the first embodiment of the present invention.

FIG. 14 shows an arrangement of the images processed by the image processing section 3 within a display range of the monitor 4. The reference sign 20 indicates a main view showing an clipped image of a wide backward area of the vehicle from the taken image.

Figure 11:
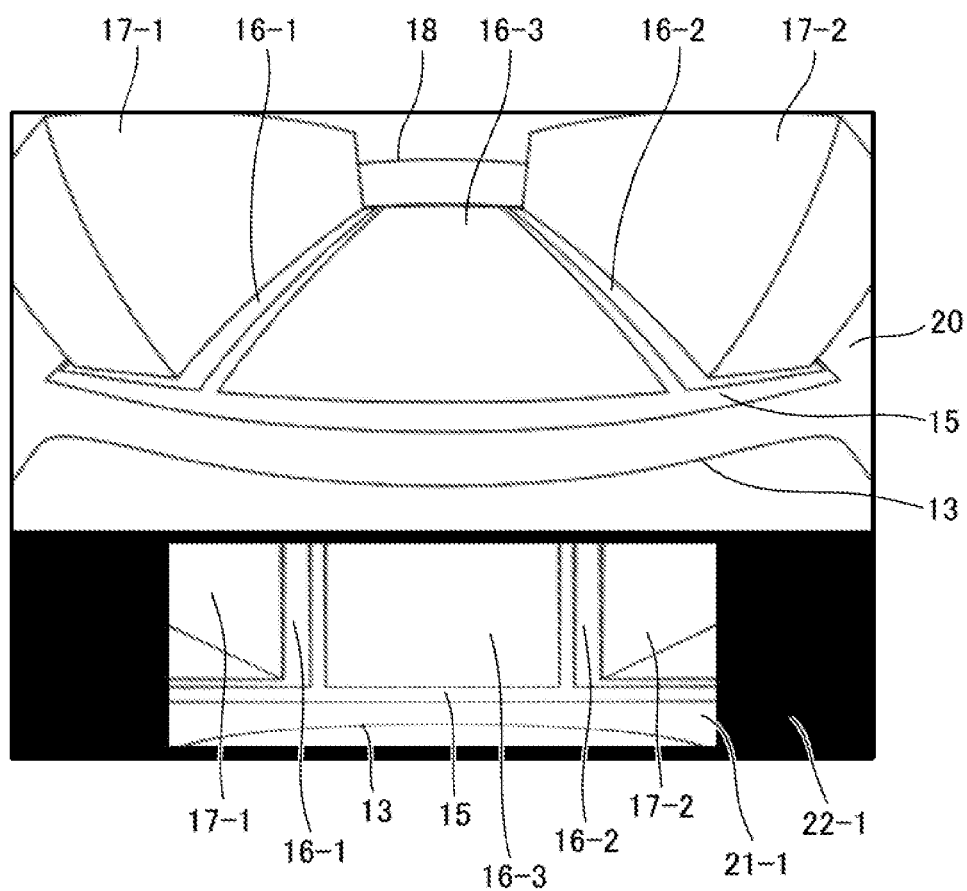
FIG. 11 is a conceptual diagram showing a displayed image processed by a conventional image processing.
Figure 12:
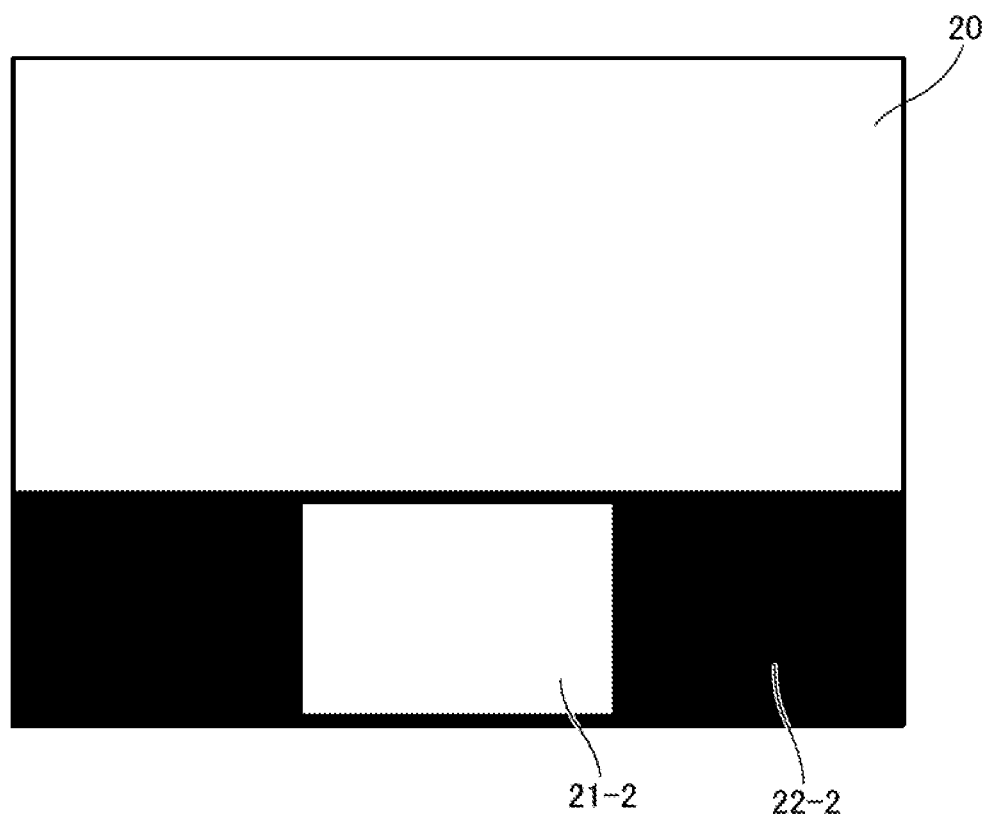
FIG. 12 is a conceptual diagram showing a displayed image processed by a conventional image processing.
Figure 13:
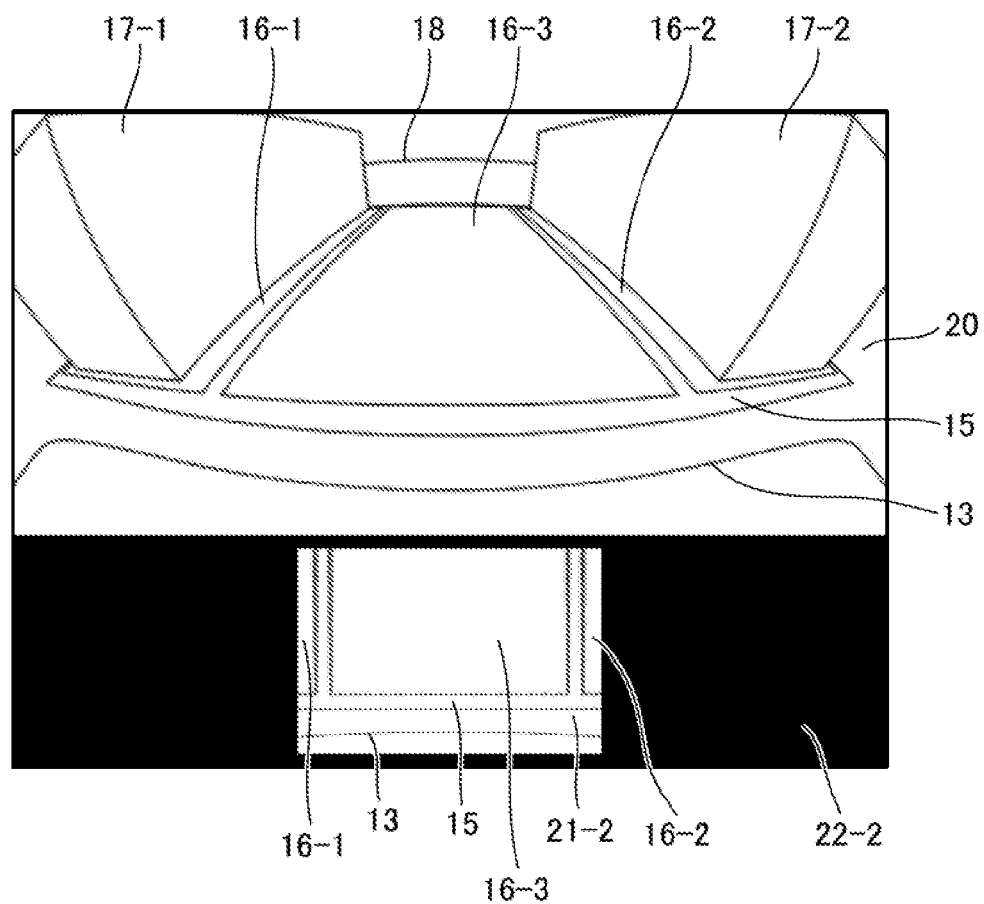
FIG. 13 is a conceptual diagram showing a displayed image processed by a conventional image processing.

In FIGS. 11 and 13, the main views 20 show the respective images obtained by the same processing as cut away left, right, top and bottom parts from the taken image shown in FIG. 9. In detail, the main view 20 shows an image of an imaging range that moderately covers a part of a bumper 13 of the vehicle 1 in a down side region and parts of the vehicles respectively parked in the left and right parking spaces in an up side region, and has an angle of view about 160 degrees between left and right sides.

While there has been described in the forgoing description about the fact that the main view 20 shows the image clipped from the taken image, the main view 20 may show an image corrected from the taken image to represent the wide area.

The reference sign 21-3 indicates a sub view showing the view point conversion image of a vicinity of the vehicle 1 as if looked down from the virtual viewpoint. The sub view 21-3 has a down side region showing a moderate part of the bumper 13. The sub view 21-3 is spread in form with increasing distance from a corresponding position of the vehicle 1. In debit, the sub view 21-3 shows a vicinity area of the bumper 13 as having a width nearly equal to a corresponding width of the vehicle and shows a distant area from the vehicle 1 as having a width larger than the corresponding width of the vehicle. The reference sign 22-3 indicates a mask picture view filling a space between the main and sub views 20 and 21-3 without the taken image.

In case that the taken image shown as FIG. 9 is processed by the image processing section 3 as described above, the processed image is shown as FIG. 15.

As will be seen from comparing the vicinity of the bumper 13 with the center parking space 16-3 in sub view 21-3, it is to be recognized that the vicinity of the bumper 13 has the width nearly equal to the width of the vehicle and that the neighbor parking spaces and the vehicles parked the neighbor parking spaces are displayed large in response to the distance from the vehicle 1. In accordance with the display area, the sub view 21-3 erases an impression that, in case that the vehicle 1 travels backward, the vehicle 1 will collide whit the vehicles parked at the respective left and right parking spaces 17-1 and 17-2.

Figure 19:
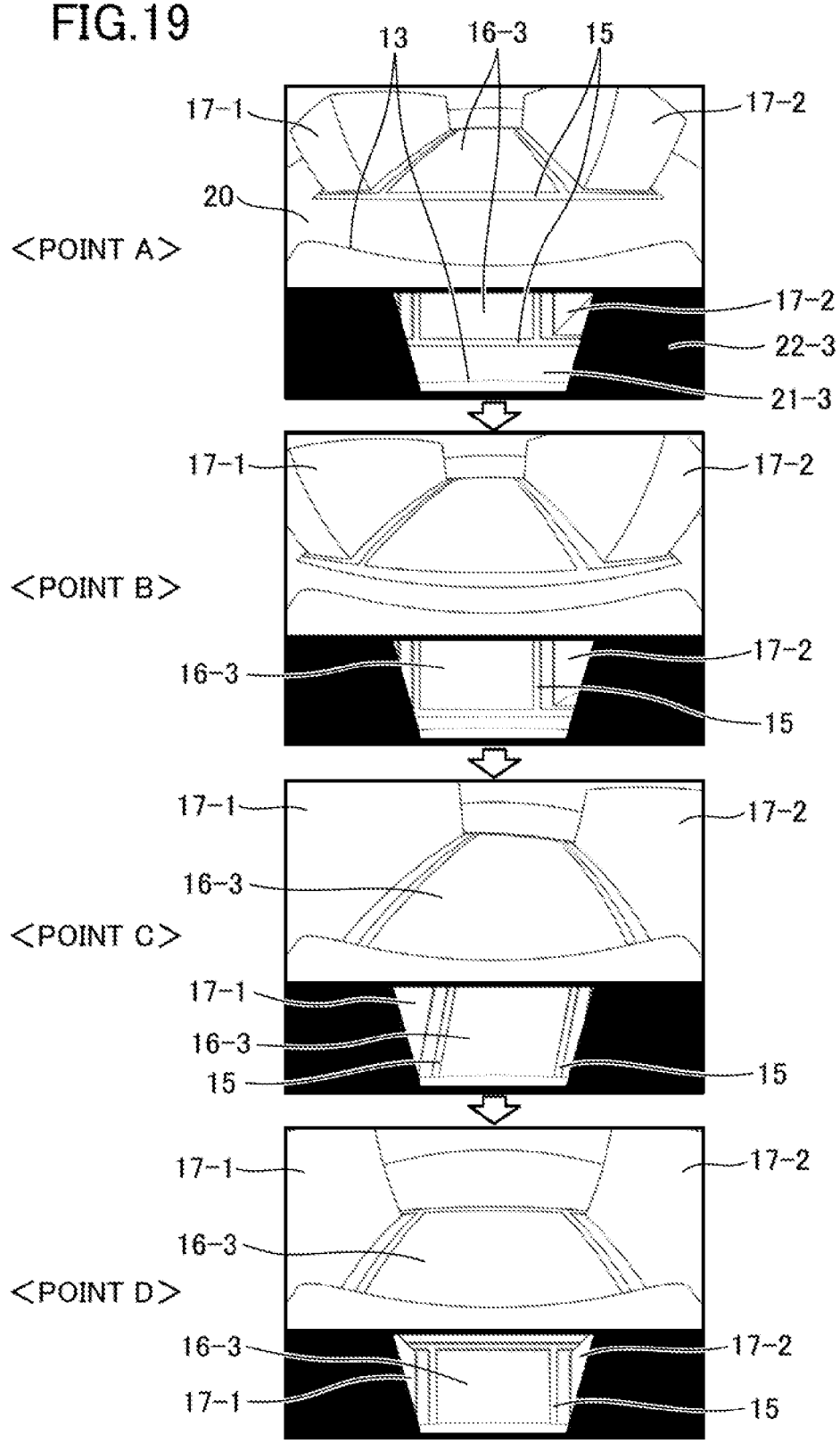
FIG. 19 is a conceptual diagram showing a changing in the displayed image in response to the position of the vehicle according to the first embodiment of the present invention.

FIG. 19 shows the displayed image in case that the vehicle 1 travels as shown in FIG. 8.

Figure 18:
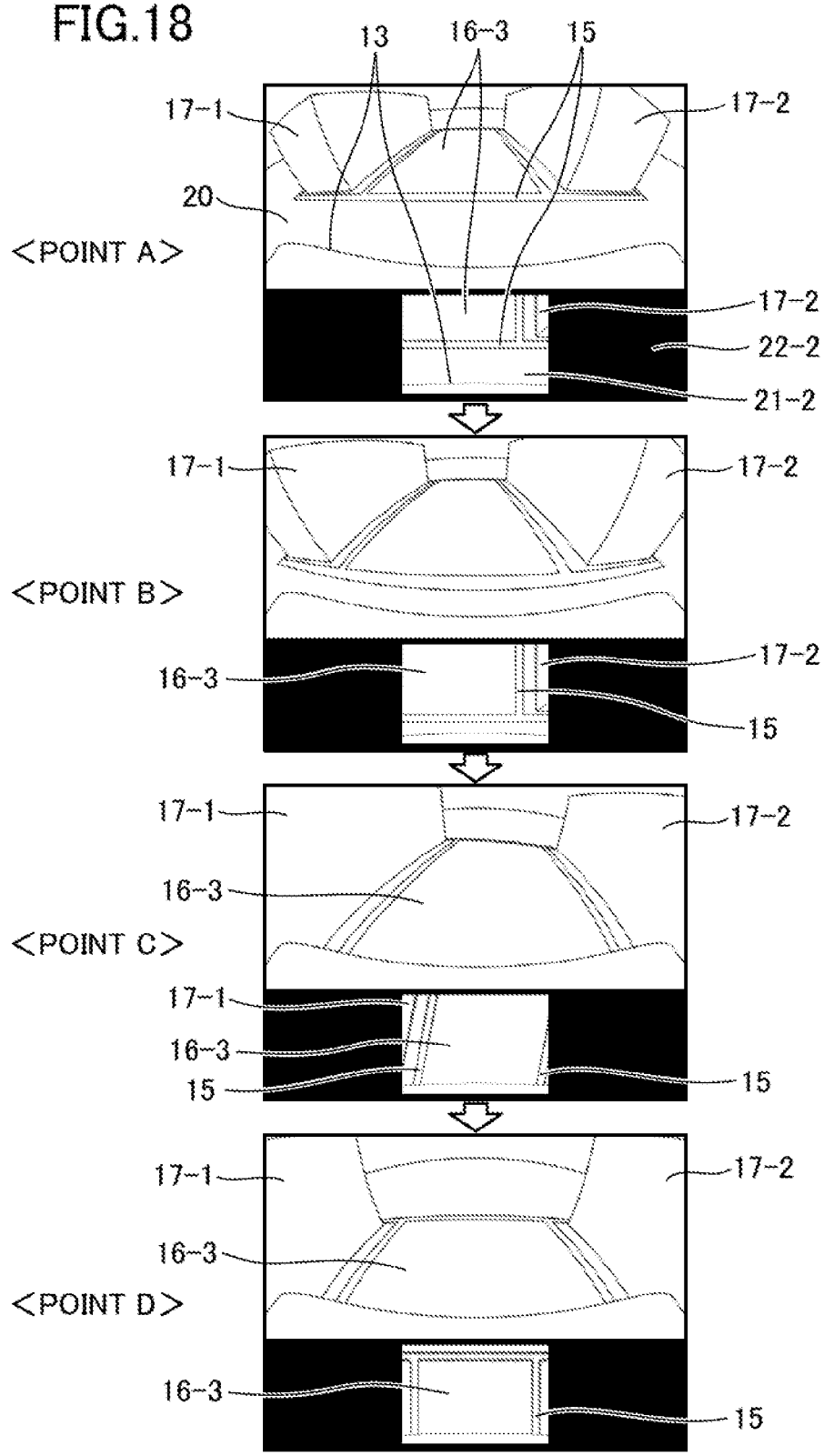
FIG. 18 is a conceptual diagram showing a changing in the conventional displayed image in response to the position of the vehicle.

The vehicle 1 travels backwardly on a straight line to be parked in the center parking space from the point A to the point B. At this time, the image shown in sub view 21-3 constantly re-presents the left and right side white lines in contrast to the example of the conventional image shown in FIG. 18. This leads to the fact that the image shown in sub view 21-3 helps with recognizing a degree of a gap of the vehicle 1 with respect to the center parking space 16-3.

Therefore, the driver recognizes the degree of the gap of the vehicle 1 by the time the vehicle 1 is reached at the point B. After that, the driver turns a steering wheel to make the vehicle 1 turn toward the center of the parking space. When the vehicle 1 reached at the point C, the image shown in sub view 21-3 constantly represents the left and right side white lines in contrast to the example of the conventional image shown in FIG. 18. This leads to the fact that the image shown in sub view 21-3 helps with recognizing a degree of an inclination of the vehicle 1 with respect to the center parking space 16-3.

After that, the driver turns a steering wheel to make the vehicle 1 travel backwardly while confirming on the sub view 21-3 the direction of the vehicle 1 changing direct to the center parking space 16-3. Accordingly, the vehicle 1 reached at the point D.

Figure 20:
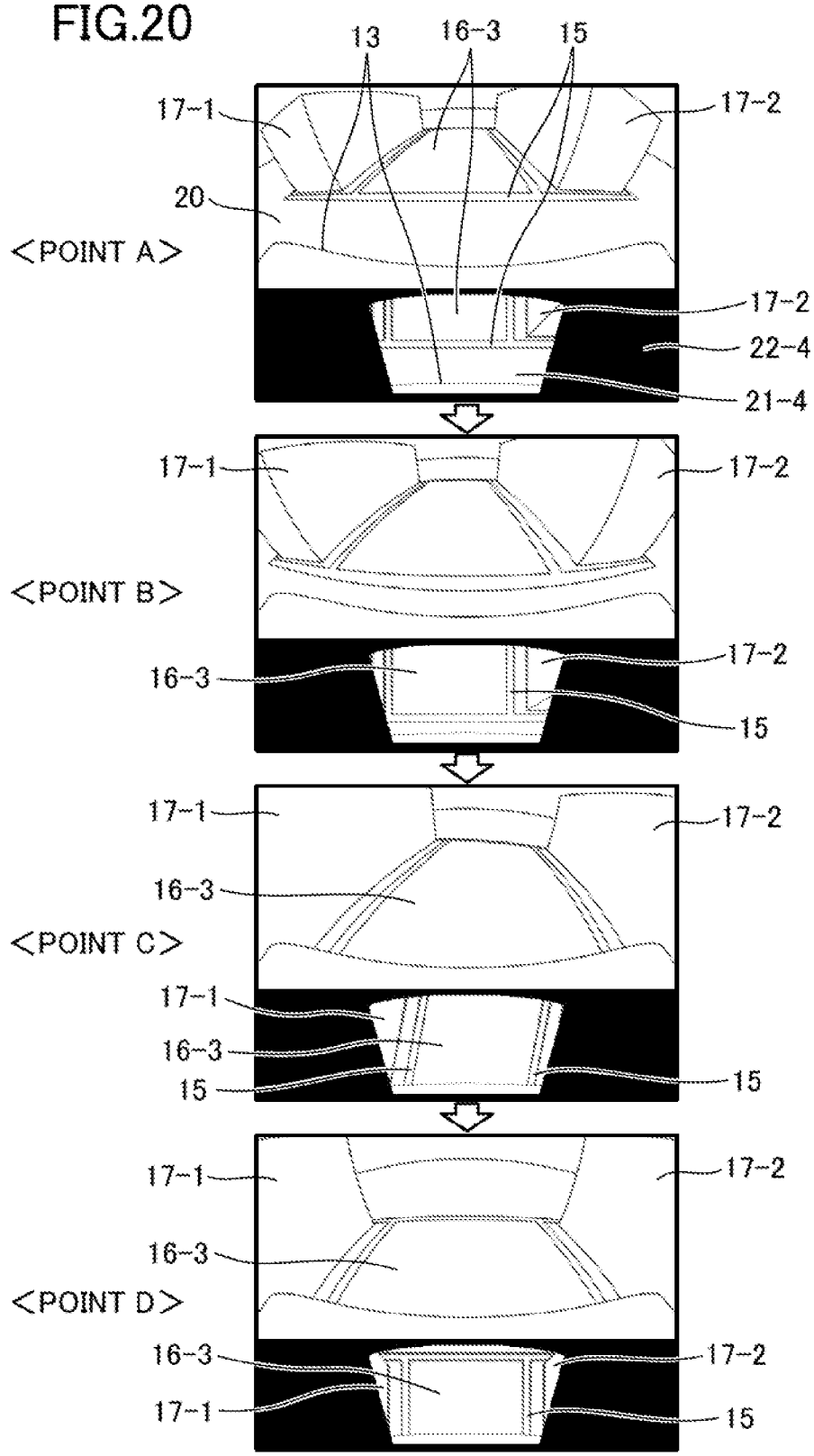
FIG. 20 is a conceptual diagram showing a changing in the displayed image in response to the position of the vehicle according to the second embodiment of the present invention.
Figure 21:
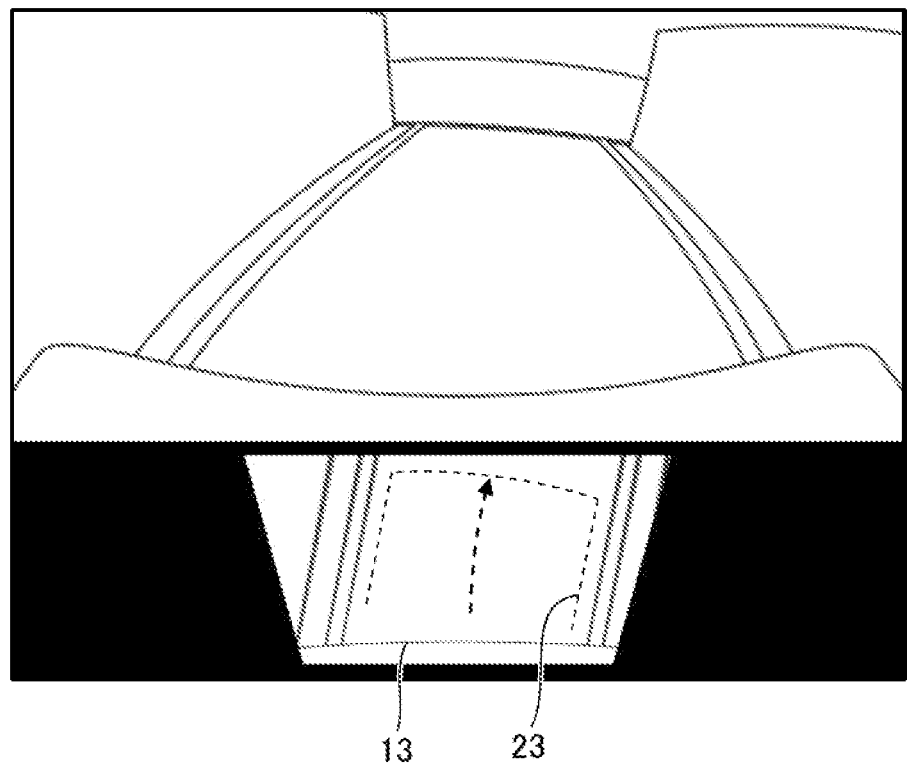
FIG. 21 is a conceptual diagram showing a prediction inclination of a side of the vehicle at a point C according to the first embodiment of the present invention.
Figure 22:
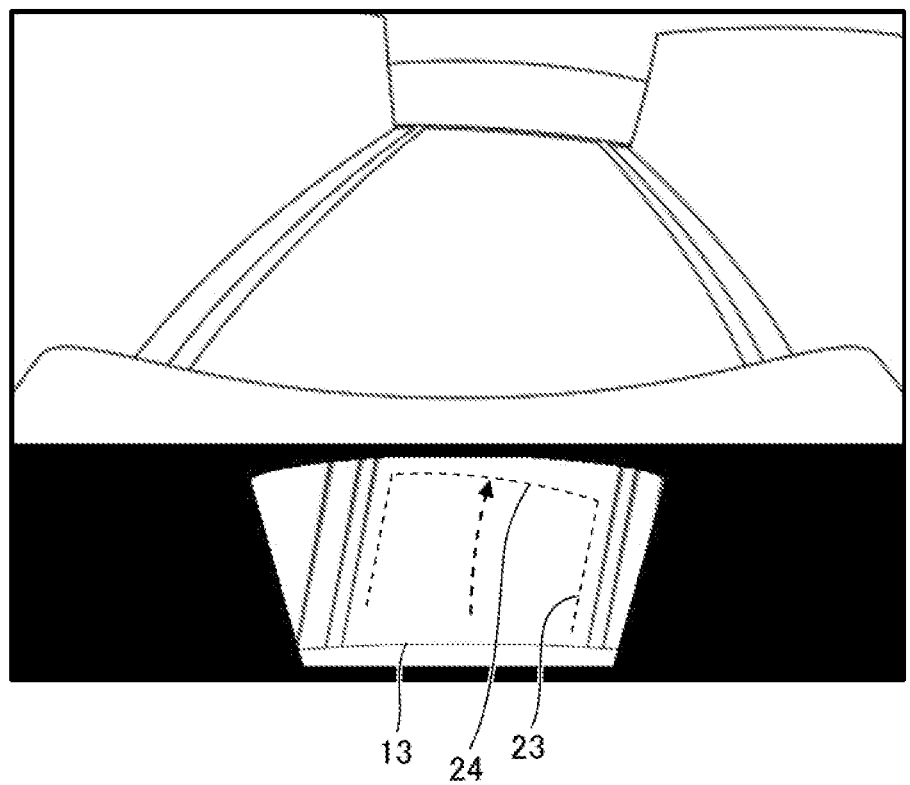
FIG. 22 is a conceptual diagram showing a prediction inclination of a bumper at the point C according to the second embodiment of the present invention.

Hereinafter, prediction of the inclination of the vehicle 1 will be explained with reference to the display image at the point C in FIG. 20.

At the point C, the vehicle 1 will be turned to the right direction in the image basis. The right side of the sub view 21-3 is rightward inclined to the same angle as a right side direction of the vehicle 1. This means the fact that, when the vehicle 1 actually travels with turning, the inclination of the right side of the sub view 21-3 closes to that of the right side direction of the vehicle 1. Accordingly, the driver can immediately predict the direction of the inclination of the side of the vehicle at an advanced position on the basis of the right side of the sub view 21-3 as indicated by the reference sign 23 in FIG. 21

As will be seen from the foregoing description, it is to be understood that the embodiment of the present invention can make the display region corresponding to the vicinity area of the vehicle keep in width nearly equal to the width of the vehicle, and make the display region corresponding to the area distant from the vehicle increase in width. This leads to the fact that the size of the vehicle can be correctly recognized, both of white side lines can be easily displayed even if the vehicle is out of alignment with the center of the parking space in some degree, and both of white side lines can be displayed without interruption even if the vehicle is inclined with respect to the parking space in some degree.

Additionally, it can be directly predicted which direction the side of the vehicle will be inclined with respect to the currently displayed image in case that the vehicle is turned in response to a turned steering wheel from this time, by the reason that the inclinations of the left and right sides on the sub view respectively close to the inclinations of the sides of the vehicle under the ease.

(Second Embodiment)

FIGS. 16, 17, 20 and 22 each shows a display image where a form of a distant side of the sub view from the corresponding position of the vehicle 1 is bent without creasing with closing to a line corresponding to a line at a constant distance from the center of the vehicle as shown in each FIGS. 14, 15, 19 and 21.

Figure 16:
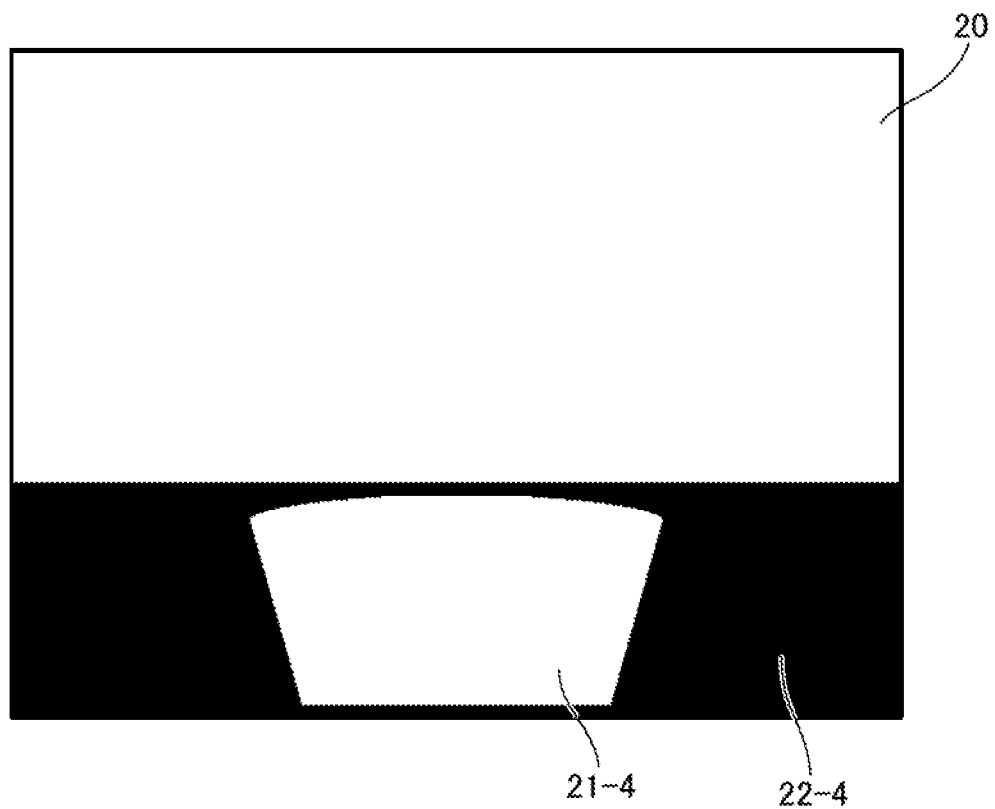
FIG. 16 is a conceptual diagram showing a displayed image processed by an image processing according to the second embodiment of the present invention.
Figure 17:
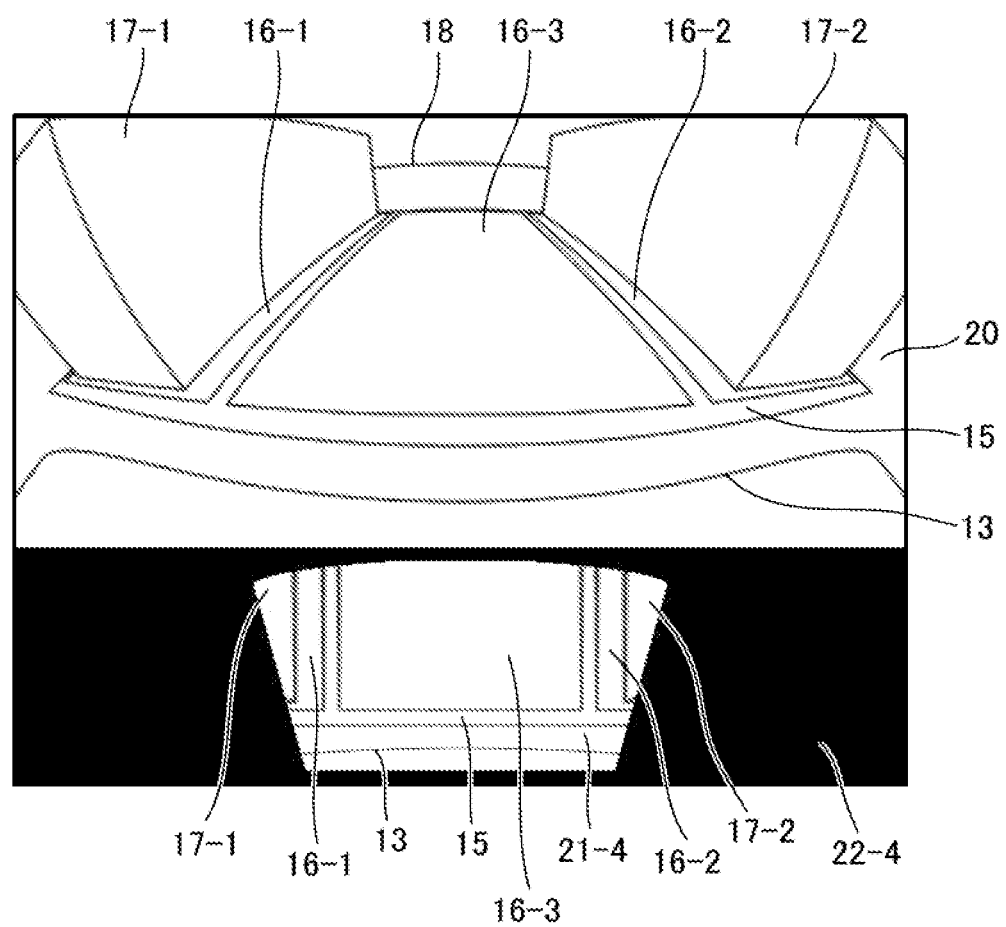
FIG. 17 is a conceptual diagram showing a displayed image processed by an image processing according to the second embodiment of the present invention.

In FIG. 16, the reference sign 20 indicates a main view similar to that of the first embodiment of the present invention. The reference sign 21-4 indicates the sub view as a side corresponding to the distant line limn the corresponding position of the vehicle 1 bent in form without creasing with closing to a line corresponding to a line at a constant distance from the center of the vehicle in contrast to the sub view 21-3. The reference sign 22-4 indicates a mask picture view filling a space between the main and sub views 20 and 21-4 without showing any taken image.

In case that the taken image shown as FIG. 9 is processed by the image processing section 3 as described above, the processed image is shown as FIG. 17. In case that the vehicle 1 travels as shown in FIG. 8, the displayed image is shown as FIG. 20. Hereinafter, it will be specifically explained at the point C in FIG. 20.

At the point C, the vehicle 1 will be turned to the right direction in the image basis as described in the first embodiment of the present invention. The bent region of the sub view 21-4 has a closely constant distance from the center of the vehicle. This means the fact that, when the vehicle 1 actually travels with turning, the inclination of bent region closes to that of the bumper 13 of the vehicle 1. Accordingly; the driver can immediately predict the direction of the inclination of the bumper at an advanced position on the basis of the bent region. The side can be predicted as indicated by the reference sign 23, thereby hiding to the fact that the inclination of the vehicle can be further easily to be predicted.

Additionally, in case that a vicinity of right, left or center of the bent portion is notably watched, the image is recognized to be displayed the direction such as, for example, a right, left or center direction with respect to the vehicle on the basis of a degree of inclination of the bent portion.

As will be seen from the foregoing description, it is to be understood that, in case that the vehicle is turned in response to a turned steering wheel, the direction of inclinations of the vehicle can be easily predicted without guide lines and the direction of the displayed image with respect to the vehicle can be easily predicted.

INDUSTRIAL APPLICABILITY

The drive assist display apparatus of the present invention is widely available for a drive assist display apparatus which can display the imaging range needed for the parking point adjustment, and make an easy recognition of the accurate width of the vehicle, pre-recognition of the inclined direction of the turned vehicle, and recognition of the direction of the subject with respect to the vehicle for the purpose of assisting the driver on smoothly parking the vehicle at the time of fine parking point adjustment.

REFERENCE SIGNS LIST 1 vehicle
2 vehicle-mounted camera
2-1 to 2-n vehicle-mounted camera
3 image processing section
4 monitor
5 image processing apparatus
6 rear wheel
7 rear axle
8 center point of left and right edges of the rear axle
9 position of lens
10 optical axis
11 rear edge portion of the vehicle
12 vehicle left-right center line
13 bumper
14 horizontal ground surface
15 white line
16-1 left parking space
16-2 right parking space
16-3 center parking space
17-1 vehicle parked in the left parking space
17-2 vehicle parked in the right parking space
18 horizon
19 image circle
20 main view
21-1, 21-2, 21-3, 21-4 sub view
22-1, 22-2, 22-3, 22-4 mask picture view
23 prediction side surface of the vehicle
24 prediction bumper

The invention claimed is:

1. A drive assist display apparatus comprising:
one or more imaging sections operable to take an image of a wide area of one of rear and front of a vehicle;
an image processing section operable to create a main view showing an image of a wide area around the vehicle by clipping or correcting from the image taken by the imaging sections, create a sub view showing a view point conversion image of a vicinity of the vehicle from the image taken by the imaging sections as if looked down from a virtual viewpoint, combine the main view with the sub view, and fill a space with a mask picture; and
an image displaying section operable to display the image processed by the image processing section, wherein
the drive assist display apparatus is designed to display the sub view in which the vicinity of the vehicle on a left side and on a right side of the sub view has the width nearly equal to the width of the vehicle,
the drive assist display apparatus is designed to display the sub view formed by two sides each corresponding to a backward or forward direction of the vehicle with spreading the two sides widely in response to an increasing distance from a corresponding position of the vehicle, and
the drive assist display apparatus is designed to bend a form of a distant side of the sub view from a corresponding position of a center of the vehicle without creasing with closing to a line corresponding to a line of an imaging range at a constant distance from the center of the vehicle.

* * * * *